(12) United States Patent
Hsieh

(10) Patent No.: US 8,807,294 B2
(45) Date of Patent: Aug. 19, 2014

(54) BRAKE RELEASE DEVICE ATTACHED TO A DOOR MACHINE

(76) Inventor: Chung-Hsien Hsieh, New Taipei (TW)

( * ) Notice: Subject to any disclaimer, the term of this patent is extended or adjusted under 35 U.S.C. 154(b) by 467 days.

(21) Appl. No.: 13/344,894

(22) Filed: Jan. 6, 2012

(65) Prior Publication Data

US 2013/0048440 A1    Feb. 28, 2013

(30) Foreign Application Priority Data

Aug. 26, 2011    (TW) .............................. 100130659 A

(51) Int. Cl.
*B62C 7/02*    (2006.01)
*F16D 59/02*    (2006.01)
*F16D 65/28*    (2006.01)
*F16D 63/00*    (2006.01)

(52) U.S. Cl.
CPC .............. *F16D 59/02* (2013.01); *F16D 65/28* (2013.01); *F16D 63/00* (2013.01)
USPC ................. 188/69; 188/161; 188/171; 160/9; 109/33

(58) Field of Classification Search
USPC ............ 188/69, 31, 156, 265, 161, 171, 158; 49/1, 5, 7, 8; 160/1, 7, 8, 9; 70/422, 70/439, 440; 109/32, 33, 34, 36
See application file for complete search history.

(56) References Cited

U.S. PATENT DOCUMENTS

| | | | | |
|---|---|---|---|---|
| 3,779,004 A | * | 12/1973 | Gloeckler | 59/93 |
| 4,505,116 A | * | 3/1985 | Weiler et al. | 60/562 |
| 5,133,201 A | * | 7/1992 | LaMott et al. | 70/226 |
| 5,203,392 A | * | 4/1993 | Shea | 160/7 |
| 5,245,879 A | * | 9/1993 | McKeon | 74/2 |
| 5,386,891 A | * | 2/1995 | Shea | 188/171 |
| 5,743,320 A | * | 4/1998 | McKeon | 160/310 |
| 7,293,805 B1 | | 11/2007 | Hsieh | |
| 8,657,096 B2 | * | 2/2014 | Hsieh | 192/223.2 |
| 8,662,140 B2 | * | 3/2014 | Hsieh | 160/310 |
| 2002/0100646 A1 | * | 8/2002 | Maurice et al. | 188/161 |
| 2003/0188938 A1 | * | 10/2003 | Li | 188/265 |
| 2006/0124250 A1 | * | 6/2006 | Hsieh | 160/9 |
| 2007/0278053 A1 | * | 12/2007 | Hsieh | 188/161 |
| 2008/0244977 A1 | * | 10/2008 | Hsieh | 49/31 |
| 2010/0132505 A1 | * | 6/2010 | Hsieh | 74/625 |
| 2010/0200338 A1 | * | 8/2010 | Laliche et al. | 187/263 |
| 2012/0024484 A1 | * | 2/2012 | Hsieh | 160/291 |
| 2013/0025804 A1 | * | 1/2013 | Hsieh | 160/305 |

* cited by examiner

*Primary Examiner* — Robert A Siconolfi
*Assistant Examiner* — Charles Poon
(74) *Attorney, Agent, or Firm* — Bacon & Thomas, PLLC

(57) ABSTRACT

A brake release device attached to a door machine comprises a ring plate provided with a plurality of openings and fixed on a pull chain disc, a base plate located at the outside of the door machine, a passive plate provided with a plurality of plug pins that correspond to the openings of the ring plate and slides together with the sliding pin, a guiding member fixed together with the base plate, a sliding pin corresponding to a brake release bar for releasing brake of the door machine and slidably guided by the guiding member, a spring element and a fusible link device that curbs the sliding pin from leaving the brake release bar. By the spring element, the guiding member stores potential energy for sliding.

7 Claims, 3 Drawing Sheets

BRAKE RELEASE DEVICE ATTACHED TO A DOOR MACHINE

BACKGROUND OF INVENTION

1. Field of the Invention

This invention relates to a brake release device for a door machine, more particularly to a brake release device attached to an ordinary door machine in such a manner that the door machine is promoted a function as a door machine for a fireproof door.

2. Background Art

A door machine that is generally employed, for example, in a vertically lifted rolling door or a garage door, comprises at least a brake device for braking the door machine so as to maintain the rolling door or the door slats at a specified or a stationary position. This type of brake device, for example, is described in U.S. Pat. No. 7,341,129 granted to the Applicant, which mainly comprises a support frame having a plurality of guiding bars; a first braking pad guided by the guiding bars so as to be movable in an axial direction of the door machine axle; a second braking pad provided at the end portion of the guiding bars; a braking component including an axle-connecting portion and a brake disc; a spring component; a compression spring for pushing the first braking pad against the braking component toward the second braking pad; and an electromagnet configured to retract the first braking pad so as to disengage said first braking pad from the braking component, thereby releasing the brake device. The brake device further comprises a manual release mechanism including a U-shape portion and a pull bar. The manual release mechanism is pivotally disposed on the second braking pad through two tail ends of the U-shape portion. The pull bar is provided outside the door machine for operating the manual release mechanism to release the brake.

The door machine employed on the vertically lifted rolling door, the garage door or safety door is basically designed for the purpose of protecting humans' lives, while the door machine used on the fireproof door is basically designed for protecting the safety of equipments and properties. Hence, theses two types of door machine have different functions and can not be used in common. In order to meet different requirements on the market, the pertinent industries have to develop at least two door machines having different types of control. Hence, development proceedings are time-consuming and costly. Further, the manufacturing is complicated due to large number of parts, and thus inventory cost is high.

Another Applicant granted U.S. Pat. No. 7,610,719 discloses a brake release device attached to a door machine which allows the general door machine to possess a function as a door machine for a fireproof door. The brake release device is attached to the door machine, comprising a first electromagnet, when energized, a sliding portion of which can slide to actuate a sliding bar; a first and a second actuator, in which the first actuator is located to abut against the brake release bar of the door machine, and a sliding pin of the first actuator is yieldingly biased in the anti-activation direction of the bar, and the second actuator is limited by a limited means at a fixed position; a second electromagnet, when energized, used to release the second actuator; a circuit including a limit switch for transiently supplying power to the first electromagnet upon resetting of the device; and a capacitor for temporarily supplying power to the second electromagnet in an event of unexpected electricity failure. Thus, in the instant of unexpected electricity failure, the brake release device can release the brake by a mechanical force, and shut off the safety door by the sliding-down of its own weight.

In addition to the above, a number of documents have proposed the door machine of fireproof door, and some examples of which are U.S. Pat. No. 5,203,392, U.S. Pat. No. 5,386,891, and U.S. Pat. No. 5,355,927.

SUMMARY OF THE INVENTION

The main object of the present invention is to provide a brake release device attached to a door machine, so that a general door machine is promoted a function of fire protection and serve as a door machine for a fireproof door machine.

In order to achieve above and other objects, the brake release device attached to a door machine according to the present invention mainly comprises: a base plate provided at the exterior of the door machine, and having a horizontal guiding portion provided at one end thereof; a passive plate guided by the guiding portion to slide between a first position and a second position; a guiding member fixed on the base plate and having an axial guiding hole; a sliding pin mounted within the guiding hole for sliding therein, one end of the sliding pin corresponding to a brake release bar and the other end of the sliding pin being connected to the passive plate; a spring element accommodated in the guiding hole, one end of the spring element abutting against the guiding member and the other end of the spring element abutting against the sliding pin in such a manner that the sliding pin is exerted by elastic potential energy to have a tendency to move toward the brake release bar; and a fusible link device provided at a predetermined position, the fusible link device being connected with the sliding pin through a connecting member so as to resist the restoring force of the spring element, so that the sliding pin is maintained at a distance from the brake release bar, and the passive plate is kept at the first position; when the surroundings temperature exceeds a melting point of the fusible link device, the fusible link device melts to release the connecting member connecting the sliding pin, and the sliding pin slides toward the brake release bar under the action of the restoring force of the spring element to impact against the brake release bar so as to release the brake device, causing the sliding-down by the weight of the door slats and simultaneously causing the passive plate to slide to the second position. In this manner, the door machine for ordinary purpose and the door machine for fireproof door can be used in common by employing the brake release device attached to a door machine of the present invention. Not only the application field of the door machine is extended, but also simplification on manufacturing and reduction on development cost of the door machine can be achieved.

Another object of the present invention is to provide a brake release device attached to a door machine, which can lock a pull chain disc, configured manually to rotate an axle of the door machine, when the brake is released by the brake release device, so as to prevent the pull chain disc from being actuated due to human error in the process of closing the rolling door, which will interrupt the closing of the door.

According to the present invention, the brake release device attached to a door machine further comprises: a ring plate fixed together with the pull chain disc, the ring plate having a plurality of equally spaced openings formed along the entire circumference thereof; a plurality of plug pins, corresponding to the openings on the ring plate, provided on the end face of the passive plate, when the passive plate is located at a first position, the plug pins are separated from the openings, and when the fusible melt device melts, causing the brake release device to release brake, the passive plate slides to a second position to cause the insertion of the plug pins into the corresponding openings on the ring plate, so that the pull chain disc is unable to be rotated. This can prevent the pull chain disc from being erroneously actuated by personnel in case of fire emergency to cause incomplete shutting of the fireproof door.

DETAILED DESCRIPTION OF PREFERRED EMBODIMENTS

The technical features of the present invention will be described by the following embodiments in conjunction with the accompanying drawings. However, it is to be noted that this invention is not limited to these embodiments. Further, the direction indicated in this context is only for the convenience of description, not intended to limit to a particular orientation.

Figure 1:
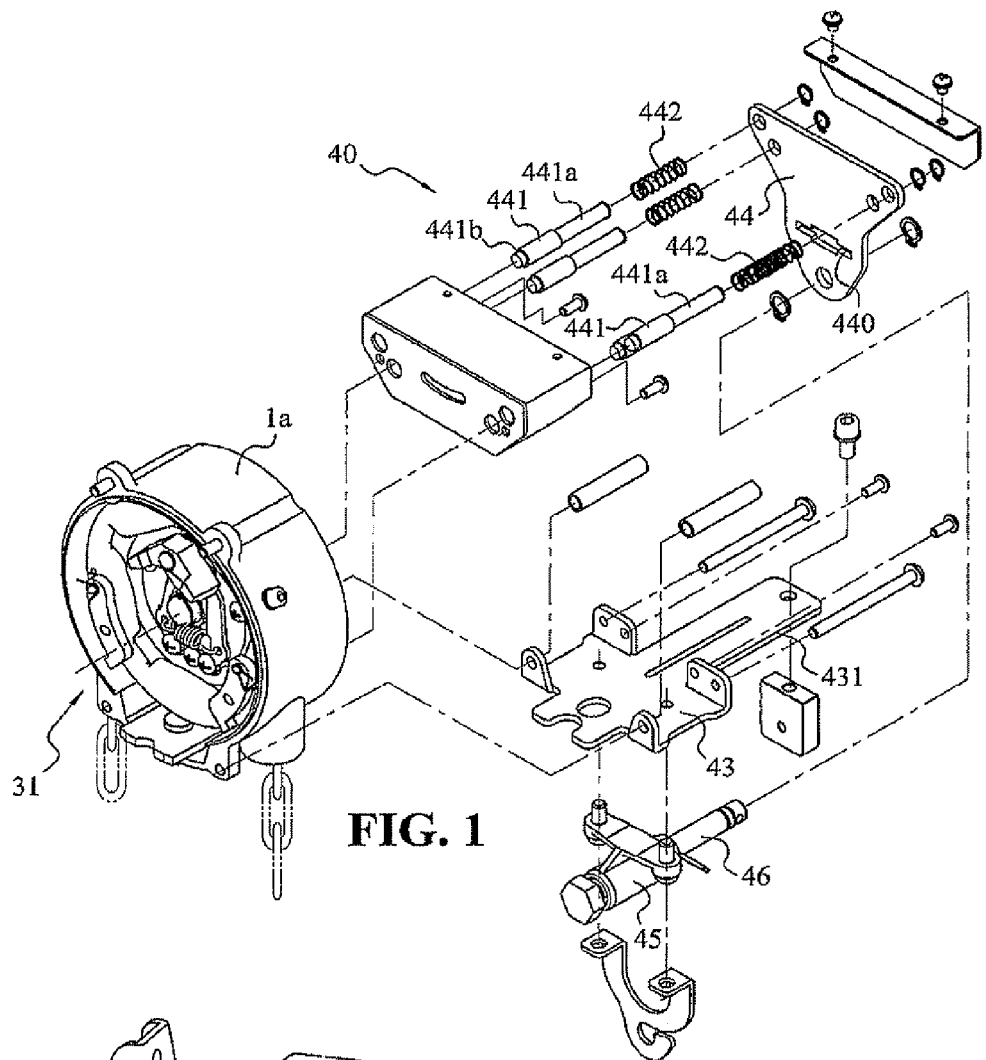
FIG. 1 is an exploded, perspective view of a brake release device according to the present invention, with irrelevant parts removed.
Figure 2:
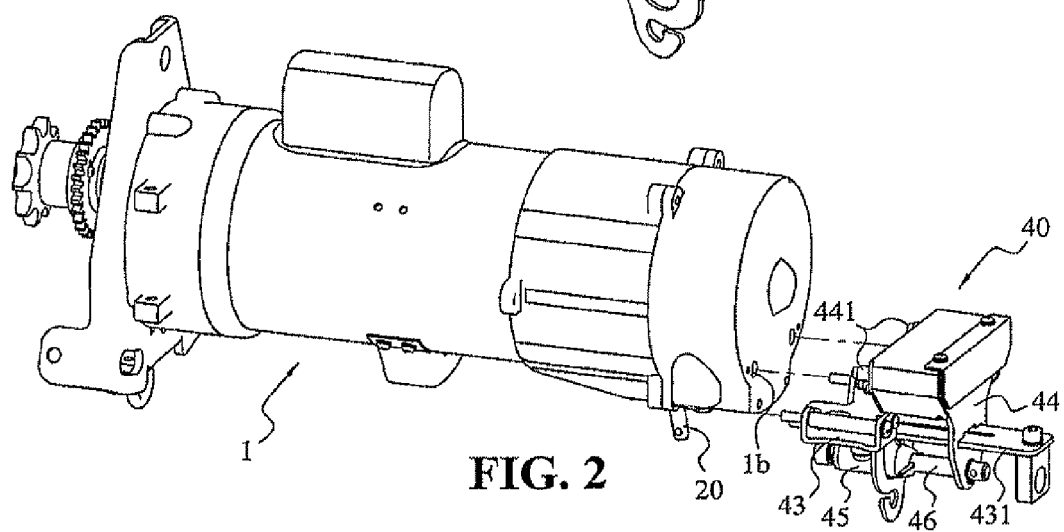
FIG. 2 is a perspective view showing the brake release device of the present invention to be attached to a door machine.
Figure 3:
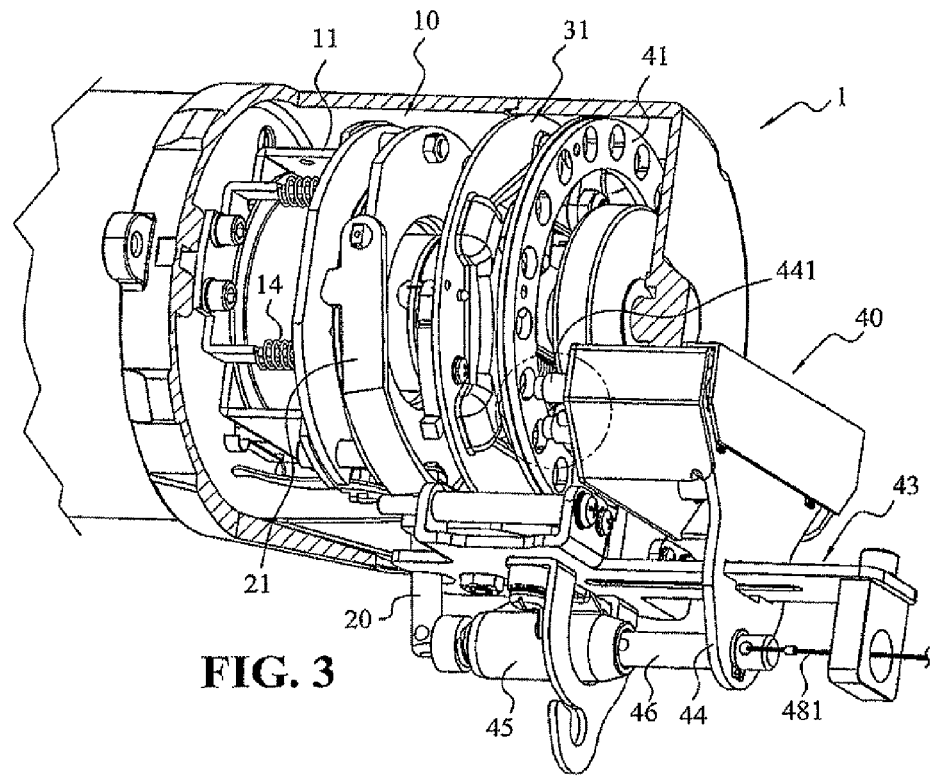
FIG. 3 is a schematic view showing the brake release device being attached onto the door machine, with sections removed to show the state where the brake is not yet released.
Figure 3A:
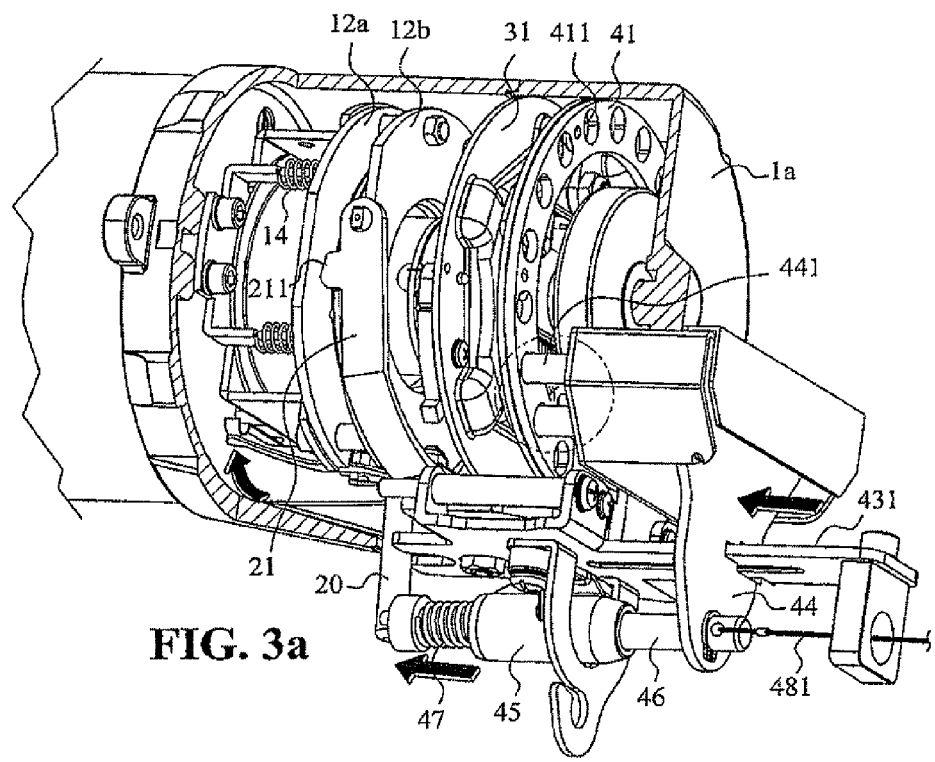
FIG. 3a is a view similar to FIG. 3, except that the brake is released.
Figure 4:
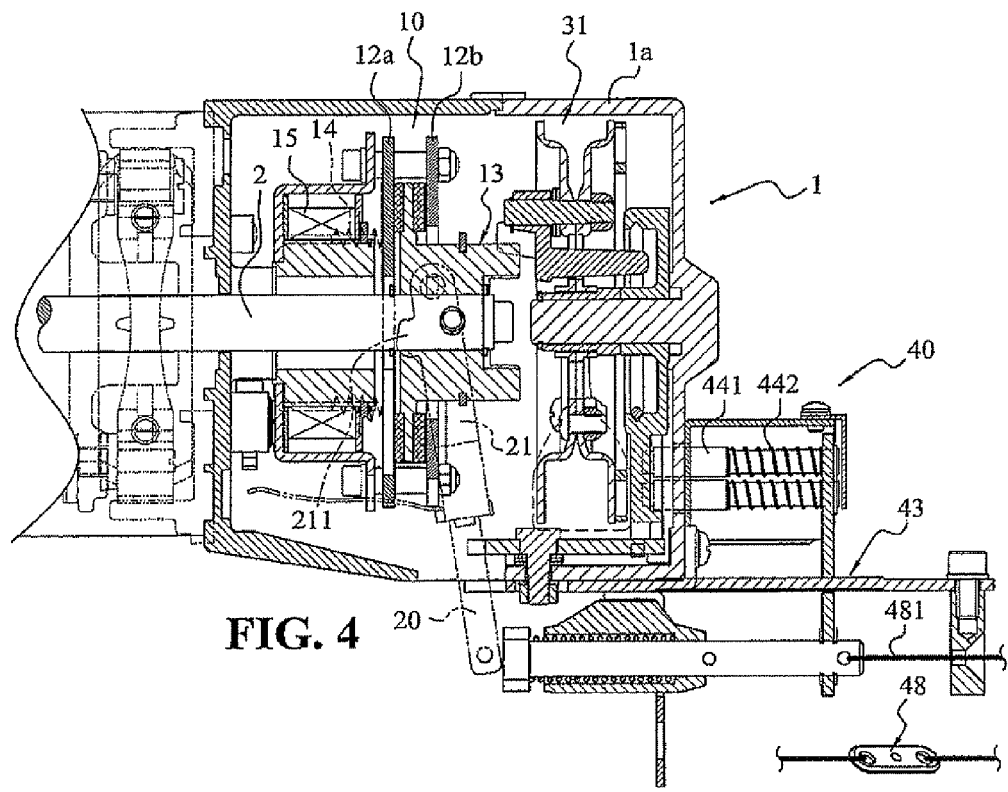
FIG. 4 is a sectional view of FIG. 3, showing the state where the brake is not yet released.
Figure 4A:
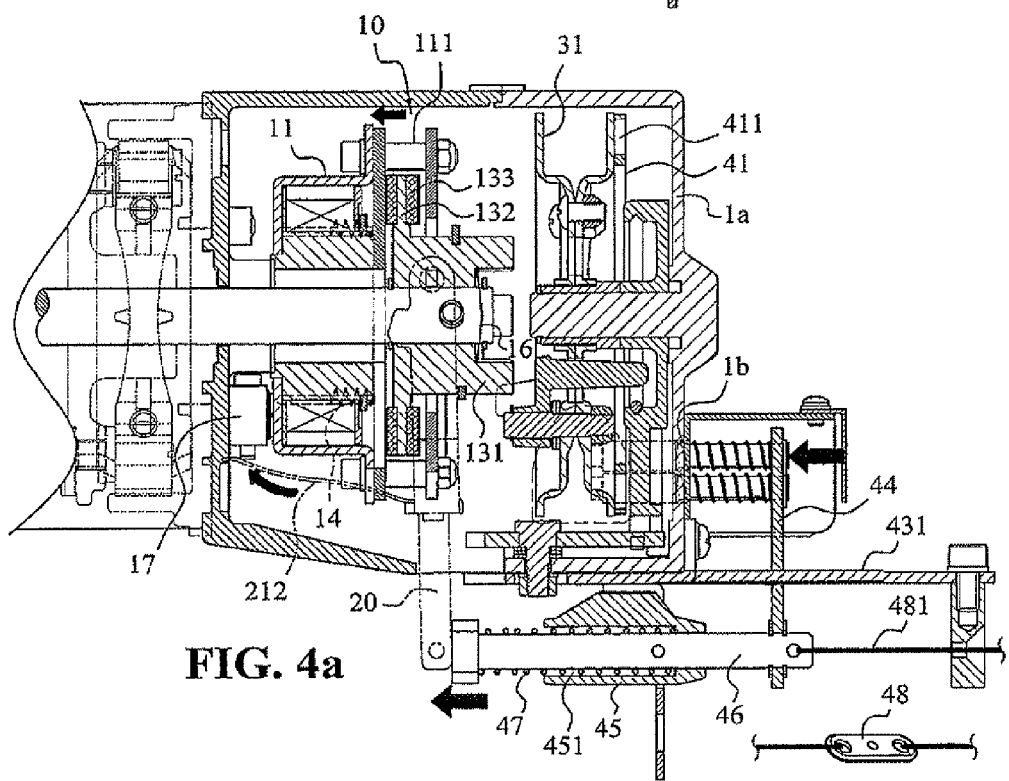
FIG. 4a is sectional view of FIG. 3a, showing the state where the brake is released.

FIGS. 1 and 2 show a brake release device attached to the exterior of a door machine. FIGS. 3, 3a, 4 and 4a are used to further describe the other objects and effects of the present invention by perspective and sectional views respectively.

Referring to the drawings, a door machine 1 is of the type that generally employed on a rolling door, a garage door or a safety door that moves vertically. The door machine 1 basically comprises an axle 2; a brake device 10 for braking the axle 2; a brake release bar 20 provided to extend to the outside of the door machine 1 for actuating the brake device 10 so as to release the axle 2; and a pull chain disc 31 for rotating the axle 2, which is received in a housing 1a located at the right side of the door machine 1. The pull chain disc 31 can be, for example, the one disclosed in U.S. Pat. No. 7,055,283 granted to the Applicant.

Referring to FIGS. 3, 3a, 4, and 4a, the brake release device 40 attached to the exterior of the door machine primarily comprises: a ring plate 41, a base plate 43, a passive plate 44, a guiding member 45, a sliding pin 46, a spring element 47, and a fusible link device 48.

The ring plate 41 is fixed on the right end face of the pull chain disc 31, a plurality of equally spaced openings 411 are formed along the entire circumference of the ring plate 41. A plurality of through holes 1b corresponding to the openings 411 of the ring plate 41 are provided on a bottom of the housing 1a at predetermined locations. The base plate 43 is fixed at the outside of the housing 1a of the door machine 1. The right side portion of the base plate 43 has an accommodation portion, and the left side portion has a horizontal guiding portion 431. The passive plate 44 has a slot 440 for the guiding portion 431 to go through, and hence the passive plate 44 is guided by the guiding portion 431 and controlled to slide between a first position and a second position. The passive plate 44 has a left portion for fixing in the accommodation portion of the base plate 43. At least a pair of plug pins 441 are provided respectively at the front side and rear side of the left end face of the passive plate 44. The plug pins 441 extend into the through holes 1b of the housing 1a corresponding to the openings 411 of the ring plate 41. The plug pins 441 are separated from the openings 411 when the passive plate 44 is located at the first position, and are inserted into the corresponding openings 411 when the passive plate 44 is located at the second position. The guiding member 45 is fixed on the base plate 43, and is arranged parallel to the axle 2 of the door machine 1. The guiding member 45 has an axial guiding hole 451. The sliding pin 46 is fitted in the guiding hole 451 for sliding axially therein. One end of the sliding in 46 corresponds to a brake release bar 20 and the other end of the sliding pin 46 is connected to the passive plate 44.

The spring element 47 is accommodated in the guiding hole 451 with one end thereof abuts against the guiding member 45 and the other end abuts against the sliding pin 46. By such a manner, the sliding pin 46 stores elastic potential energy that tends to move the sliding pin 46 toward the brake release bar 20. The fusible link device 48 is provided at a predetermined location remote from the door machine 1. The fusible link device 48 is connected with the sliding pin 46 through a connecting member 481 so as to resist the restoring force of the spring element 47, such that the sliding pin is maintained at a distance from the brake release bar 20, and the passive plate 44 is kept at the first position. When the surrounding temperature exceeds the melting point of the fusible link device 48, the fusible link device 48 melts to release the connecting member 481 so that the sliding pin 46 are acted by the restoring force of the spring element 47 to slide toward said brake release bar 20, and impact against the brake release bar 20, thus causing the same to rotate to the left side and actuates the brake device 10 to release the brake, so that the door panel can slide down by its own weight and shut the door. When the brake release device 40 releases the brake, the passive plate 44 simultaneously slides to the second position so that the plug pins 441 insert into corresponding openings 411 of the ring plate 41 and lock the pull chain disc 31 into irrotational state.

Referring again to FIGS. 1, 4 and 4a, the plug pin 441 includes a small diameter segment 441a at one end thereof with the end portion of the small diameter segment 441a slidably mounted on the passive plate 44. A spring component 442 is compressibly fitted on the outside of the small diameter segment 441a with one end of the spring component 442 abutting against the plug pin 441 and the other end of the spring component 442 abutting against the passive plate 44, so that the plug pin 441 has the tendency of returning to its original position during sliding. Further, the plug pin 441 has a small diameter end 441b formed at an end facing the ring plate 41. When the plug pins 441 move with the passive plate 44 to the second position during the process of brake release by the brake release device 40, even if the small diameter ends 441b of the plug pins 441 misalign with the openings 411 of the ring plate 41, the plug pins 441 retract backward causing the spring component 442 to compress and store potential energy. At this moment, the small diameter ends 441b abut against the ring plate 41 by the action of the stored potential energy of the spring component 442. When the pull chain disc 31 is erroneously activated, the small diameter ends 441b of the plug pins 441 can fit into the openings 411 of the ring plate 41 so as to lock the pull chain disc 31 into an irrotational state. In this manner, erroneous actuation by personnel, which can cause incomplete shutting of the fireproof door in case of fire emergency panic condition, can be avoided.

The brake device 10 and the brake release rod 20 depicted in FIGS. 3, 3a, 4, and 4a have been disclosed in U.S. Pat. No. 7,341,129 granted to the Applicant. The brake device 10 comprises: a support stand 11 arranged along the outer periphery of an axle 2 of the door machine 1 and received in the housing 1a of the door machine 1, the support stand 11 having a plurality of guiding rods 111; a moving disc 12a guided by the guiding rods 111 to move axially along the axle 2; a stationary disc 12b provided at the end portions of the guiding rods 111; a braking component 13 including a sliding portion 131 and a brake disc 132, the braking component 13 being capable of moving within a predetermined gap range along the axle 2 and being disposed on the axle 2 without rotating relative to the axle 2, the brake disc 132 being arranged to interpose between the moving disc 12a and the stationary disc 12b, brake linings 133 being respectively provided on end faces of both sides of the brake disc 132 and being in frictional engagement with the moving disc 12a and the stationary disc 12b respectively; at least one compression spring 15 used to push the moving disc 12a toward the stationary disc 12b so as to clamp the brake disc 132 tightly; an electromagnet 15 used to retract the moving disc 12a, when it is excited, so as to separate the moving disc 12a from the brake disc 132 to release the braking component; a restoring spring sheet 16, being compressed when the brake disc 132 is clamped tightly so that the elastic potential energy stored in the restoring spring sheet 16 acts on the braking component 13 in the process of retract the moving disc 12a from the brake position, and the brake disc 132 is separated from the stationary disc 12b.

Furthermore, the brake release bar 20 comprises a U-shaped portion 21. Both end portions of the U-shaped portion 21 are pivotally disposed on the stationary disc 12b. Projections 211 are respectively fowled at both ends of the U-shaped portion 21 to abut against the moving disc 12a. When the brake release bar 20 is actuated by an external force to rotate to the left side, the projections 211 can push the moving disc 12a away so as to separate the moving disc 12a from the brake disc 132. Furthermore, the brake device 10 comprises a sensor switch 17 which is connected to the circuit of the door machine 1. The U-shaped portion 21 of the brake release bar 20 correspondingly has a contact arm 212. When the brake release bar 20 is actuated by an external force to release the brake, the contact arm is able to contact the sensor switch 17 so as to switch off the circuit of the door machine 1.

Summing up above, by employing the brake release device attached to a door machine of the present invention, ordinary door machine can possess the function as a fireproof door machine so that common usage can be achieved between ordinary door machine and fireproof door machine. Not only low development cost and simplification on manufacturing but also inventory reduction and easiness in assembly interchange can be achieved. Moreover, the pull chain disc can be locked to become irrotational upon the brake releasing, so that the pull chain disc can be prevented from being erroneously actuated by personnel in fire emergency panic condition to cause incomplete shutting of the fireproof door.

It is understood that the above embodiment is merely a preferred embodiment for description and is not intended to limit the implementation scope of the present invention. Equivalent modifications and variations without departing from the scope of present invention, which is well defined in the attached claims, are still considered to be within the scope of the present invention.

What is claimed is:

1. A brake release device (40) attached to a door machine, said door machine (1) comprises an axle (2), a brake device (10) for braking said axle (2), a brake release bar (20) provided at the outside of said door machine (1) for actuating said brake device (10) to release said axle (2), and a pull chain disc (31) for rotating said axle (2), wherein said brake release device (40) comprises:
 a ring plate (41) fixed on a lateral end face of said pull chain disc (31), a plurality of equally spaced openings (411) being formed along the entire circumference of said ring plate;
 a base plate (43) provided at the outside of said door machine (1), and having a horizontal guiding portion (431) at one end thereof;
 a passive plate (44) having a plurality of plug pins (441) corresponding to said openings (411) of said ring plate (41) being provided on one end face thereof, said passive plate being guided by said guiding portion (431) to move between a first position in which said plug pins (441) are separated from said openings (411), and a second position in which said plug pins (441) are inserted into corresponding openings (411);
 a guiding member (45) parallel to said axle (2) being disposed on said base plate (43), said guiding member (45) having an axial guiding hole (451);
 a sliding pin (46) mounted within said guiding hole (451) for sliding therein, one end of said sliding pin (46) corresponding to said brake release bar (20) and the other end of said sliding pin (46) being connected to said passive plate (44);
 a spring element (47) accommodated in said guiding hole (451), one end of said spring element (47) abutting against said guiding member (45) and the other end of said spring element (47) abutting against said sliding pin (46) to an effect that said sliding pin (46) is compressed by said spring element and tends to move toward said brake release bar (20); and
 a fusible link device (48) having one end provided at a predetermined position, and the other end connected with said sliding pin (46) through a connecting member (481) so as to resist the restoring force of said spring element (47), so that the sliding pin is maintained at a distance from said brake release bar (20), and said passive plate (44) is maintained at said first position; when the surrounding temperature exceeds the melting point of said fusible link device (48), said fusible link device (48) melts and said connecting member (481) connecting said sliding pin is released, and said sliding pin (46) slides toward said brake release bar (20) under the action of the restoring force of said spring element to impact against said brake release bar (20) so as to release said brake device (10), whereby said passive plate (44) is actuated to move to said second position.

2. The brake release device as claimed in claim 1, wherein said pull chain disc (31) is accommodated in a housing (1a) of said door machine (1), said ring plate (41) being provided on the right end face of said pull chain disc (31), a plurality of through holes (1b) corresponding to said openings (411) of said ring plate (41) being provided on said housing (1a); said base plate (43) being fixed at an outside end face of said housing (1a), said base plate (43) having a space for receiving said passive plate (44) therein, said passive plate (44) having at least one pair of plug pins (441) provided within said through holes (1b) of said housing (1a).

3. The brake release device as claimed in claim 2, wherein each of said plurality of plug pins (441) includes a small diameter segment (441a) at one end thereof with an end portion of said small diameter segment slidably disposed on the passive plate (44); a spring component (442) being arranged to encircle the periphery of said small diameter segment (441a) with one end thereof abutting against said plug pin (441) and the other end thereof abutting against said passive plate (44) so that said plug pin (441) has a tendency to restore to its original position during sliding.

4. The brake release device as claimed in claim 3, wherein each of said plurality of plug pins (441) has a small diameter end (441b) formed at one end facing said ring plate (41); when said brake release device (40) releases the brake, said small diameter ends (441b) of said plug pins (441) are inserted into said openings (411) so as to lock said pull chain disc (31) into an irrotational state.

5. The brake release device as claimed in claim 1, wherein said brake device (10) comprises:
- a support stand (11) arranged to encircle the outer periphery of said axle (2) of said door machine (1) and received in said housing of said door machine (1), said support stand (11) having a plurality of guiding rods (111) fixed at one end and disposed to be parallel with said axle (2);
- a moving disc (12a) movable in an axial direction of the axle (2) by being guided by said guiding rods (111);
- a stationary disc (12b) provided at the other end of said guiding rods (111) and is arranged to face said moving disc;
- a braking component (13) including a sliding portion (131) and a brake disc (132), said sliding portion being arranged on said axle of the door machine such that the sliding portion is movable in said axial direction of the axle by a predetermined range, said brake disc (132) being arranged to be interposed between said moving disc (12a) and said stationary disc (12b), brake linings (133) being provided on both sides of said brake disc (132) so as to be in frictional engagement with said moving disc (12a) and said stationary disc (12b);
- at least one compression spring (15) having one end biasing against said moving disc (12a) so as to urge said brake disc (132) against said stationary disc (12b), to thereby clamping said brake disc (132);
- an electromagnet (15) arranged to oppose said moving disc (12a) and configured to retract said moving disc (12a) when energized, so as to disengage said moving disc (12a) from said brake disc (132), to thereby releasing said braking component (13); and
- a restoring spring sheet (16) having one end disposed on an end face of said sliding portion (131) and the other end abutting against said axle (2), and is compressed when said brake disc (132) is clamped, and when said moving disc (12a) is retracted to disengage from said brake disc, the restoring force of said spring sheet acts on said sliding portion (131), so as to disengage said brake disc (132) from said stationary disc (12b).

6. The brake release device as claimed in claim 5, wherein said brake release bar (20) comprises a U-shaped portion (21) at the other end thereof, both end portions of said U-shaped portion (21) being pivotally disposed on said stationary disc (12b), projections (211) being provided on said end portions of said U-shaped portion (21) to abut against said moving disc (12a), when said brake release bar (20) is actuated by an external force, so as to disengage said moving disc (12a) from said brake disc (132).

7. The brake release device as claimed in claim 6, wherein said brake device (10) comprises a sensor switch (17) electrically connected to the circuit of said door machine (1); said U-shaped portion (21) of said brake release bar (20) having a contact arm (212) that triggers said sensor switch (17) to switch off the circuit of said door machine (1) when said brake release bar (20) is actuated by the external force to release the brake.

* * * * *